(12) United States Patent
Gunther

(10) Patent No.: US 7,866,975 B2
(45) Date of Patent: Jan. 11, 2011

(54) OPERATING DEVICE FOR SHUT-OFF NEEDLES IN INJECTION-MOULDING DEVICES WITH NEEDLE VALVE NOZZLES

(75) Inventor: Herbert Gunther, Allendorf/Eder (DE)

(73) Assignee: Gunther Heisskanaltechnik GmbH, Frankenberg (DE)

( * ) Notice: Subject to any disclaimer, the term of this patent is extended or adjusted under 35 U.S.C. 154(b) by 23 days.

(21) Appl. No.: 12/087,365

(22) PCT Filed: Nov. 23, 2006

(86) PCT No.: PCT/EP2006/011212

§ 371 (c)(1),
(2), (4) Date: Nov. 21, 2008

(87) PCT Pub. No.: WO2007/085285

PCT Pub. Date: Aug. 2, 2007

(65) Prior Publication Data

US 2009/0311357 A1    Dec. 17, 2009

(30) Foreign Application Priority Data

Jan. 2, 2006    (DE) .................. 20 2006 000 036 U

(51) Int. Cl.
B29C 45/23    (2006.01)
(52) U.S. Cl. ..................................... 425/564
(58) Field of Classification Search .............. 425/562, 425/563, 564, 565, 566
See application file for complete search history.

(56) References Cited

U.S. PATENT DOCUMENTS 4,497,621 A    2/1985 Kudert et al.

(Continued)

FOREIGN PATENT DOCUMENTS

DE    29 48 624    6/1980

(Continued)

OTHER PUBLICATIONS

J. Essinger, "Nadelverschlusstechnik im Einsatz", Aug. 2005, XP002421874.

(Continued)

*Primary Examiner*—Tim Heitbrink
(74) *Attorney, Agent, or Firm*—Clark & Brody

(57) ABSTRACT

An operating device (10) for shut-off needles in injection moulding tools with needle valve nozzles has a displaceable element (20) to which at least two shut-off needles (16) can be fastened and which can be moved between two guide rails (30) mounted so as to be longitudinally displaceable in a second direction (D2) that is perpendicular to the first direction (D1). At least two slide elements (50) are arranged between the displaceable element (20) and the guide rails (30) in grooves (40) running obliquely with respect to the first direction (D1) and to the second direction (D2), which convert a movement of the guide rails (30) in the first direction (D1) into a displacement motion of the displaceable element (20) in the second direction (D2). In order to achieve a flexible and easily manageable construction that permits inexpensive subsequent extensions and/or changes, the invention provides that at least one additional displaceable element (120) is arranged at the guide rails, where at least two slide elements (150) are arranged between the additional displaceable element (120) and the additional guide rails (130) in grooves (140) running obliquely with respect to the first direction (D1) and to the second direction (D2).

27 Claims, 3 Drawing Sheets

U.S. PATENT DOCUMENTS 7,553,150 B2 * 6/2009 Kaushal et al. ............. 425/564

FOREIGN PATENT DOCUMENTS

| DE | 196 11 880 | A1 | 10/1997 |
| DE | 199 07 116 | A1 | 8/2000 |
| DE | 199 55 320 | C1 | 3/2001 |
| EP | 0 790 116 | A2 | 8/1997 |
| FR | 2 085 350 | | 4/1982 |
| FR | 2 708 230 | | 2/1995 |
| JP | 57-45041 | | 3/1982 |
| JP | 9-225965 | | 9/1997 |
| JP | 2004-243532 | | 9/2004 |
| WO | 2007/085285 | A1 | 8/2007 |

OTHER PUBLICATIONS

"Harmonie Auf Engstem Raum" Plastverarbeiter, Huethig GMBH, Heidelberg, DE, vol. 49, No. 3, Mar. 1998, XP000767117.

* cited by examiner

OPERATING DEVICE FOR SHUT-OFF NEEDLES IN INJECTION-MOULDING DEVICES WITH NEEDLE VALVE NOZZLES

FIELD OF THE INVENTION

The invention refers to an operating device for shut-off needles in injection moulding tools with needle valve nozzles as well as an injection moulding tool.

BACKGROUND ART

Needle valve nozzles are installed in injection moulding tools in order to feed a flow-capable mass to a separable mould insert at a specifiable temperature and under high pressure. They are usually equipped with pneumatically or hydraulically driven shut-off needles, which periodically open and close the sprue openings in the mould insert. For this purpose, every shut-off needle is positioned in the tool area of the injection moulding device in an axially displaceable manner and preferably guided through the center of a flow channel in the nozzle area for the mass to be processed. The flow channel terminates in a nozzle end piece that forms a spray orifice. In a closed position, the lower end of the shut-off needle engages with a landing bar that is formed in the nozzle end piece or the mould insert.

In order to be able to synchronously open and close several needle valve nozzles in one tool, it is possible to follow a procedure familiar from EP-A2-0790 116 to fasten the shut-off needles along a common carrier plate, which carries out a displacement motion in the longitudinal direction of the shut-off needles. For this purpose the carrier plate is arranged on the front between two fixed stops and on the side between two guide strips, which are positioned inside a bolster plate in a longitudinally displaceable manner and have oblique sliding blocks or sliding cams on the side surfaces that are directed to the carrier plate. The sliding cams engage with the side of the carrier plate, which is furnished with obliquely running grooves. If the guide strips are moved back and forth in the longitudinal direction by means of an actuator, the carrier plate moves up and down accordingly in a vertical direction. This way all shut-off needles fastened to the carrier plate will carry out the same displacement motion.

This kind of operating device has the disadvantage that the dimensions of the carrier plate and the number of shut-off needles fastened to it have fixed specifications. Therefore any extensions are only possible by replacing the carrier plate and guide strips, which is associated with a substantial effort and corresponding costs.

In an injection moulding tool referred to by DE-A1-196 11 880 with several needle valve nozzles, each shut-off needle is fastened to a separate needle support element. These are equipped with obliquely positioned guiding cams positioned on two opposing flat surfaces, which engage with the obliquely running grooves of a fork-shaped sliding frame. A cylindrical section is formed at each needle support element below the flat surfaces, which is positioned just like a piston in a guide bushing in an axially displaceable manner. When the sliding frames are moved back and forth, the individual needle support elements move up and down accordingly in a vertical direction.

This too only allows for a limited amount of needle support elements to be arranged in succession. Each additional element requires an extended sliding frame which has to be fabricated separately. It is also problematic that every shut-off needle has to be attached to its needle support element by way of an elastic interim element, which also increases the maintenance efforts and fabrication costs.

DE-A1-199 07 116 reveals an operating mechanism for injection moulding valve elements that is positioned between two tool plates. The individual valve bolts of a nozzle group are attached to a common valve bolt plate, which is equipped with guide bushings along the edge and can glide up and down on guide bolts that are parallel to the valve bolts. Two actuating arms are attached to the valve bolt plate, which support several sliding blocks on the side. These engage with the obliquely running grooves of two cam elements, which are each positioned in a longitudinally displaceable manner between the upper tool plate and one mounting plate each.

Since the intervals between the guide bolts and the position of the actuating arms are clearly specified, no subsequent changes may be made here either. Additional shut-off needles can only be attached if the entire valve bolt plate is replaced, which is associated with a major construction expenditure. The placement of the actuating arms and the additionally required mounting plates also result in a relatively large overall height of the operating device, which means that the use of the operating device is limited, especially in smaller tools.

SUMMARY OF THE INVENTION

The aim of the invention is to avoid these and other disadvantages of the current state of technology and to create a compact operating device for injection moulding tools with needle valve nozzles that constantly moves all valve needles in a synchronous manner and attributes an equal clamp force to them. One particular aim is a flexible and easily manageable assembly that permits inexpensive subsequential extensions and/or changes.

For an operating device for shut-off needles in injection moulding tools with needle valve nozzles, with a displaceable element that at least two shut-off needles can be fastened to and which can be moved between two guide rails mounted so as to be longitudinally displaceable in a second direction that is perpendicular to the first direction, where at least two slide elements are arranged between the displaceable element and the guide rails in grooves running obliquely with respect to the first direction and to the second direction, which convert a movement of the guide rails in the first direction into a displacement motion of the displaceable element in the second direction, the invention provides that at least two additional guide rails can be coupled to the guide rails, between which at least one additional displaceable element is arranged at which at least two additional shut-off needles can be fastened, where at least two sliding elements are arranged between the additional displaceable element and the additional guide rails in grooves running obliquely to the first direction and to the second direction, which convert a movement of the additional guide rails along the first direction into a displacement motion of the additional displaceable element in the second direction.

This makes it possible to expand the operating device at any time with additional guide rails and additional displaceable elements without having to replace or change the already existing construction elements. The additional displaceable element is simply supplemented with the additional guide rails, where the latter can be quickly and comfortably coupled to the already present guide rails. The entire operating device can therefore be flexibly expanded or adjusted without any major effort, while high costs are avoided by the continued usability of the previous components.

Affixing the valve needles at the common displaceable elements and coupling the guide rails ensures that all valve needles are always moved synchronously and attributed an equal clamp force.

The guide rails are connected to each other in a separable manner so that the extensions can be removed again at any time. What is important is that there is a tensile strength connecting the guide rails in respect to the first direction so that the displaceable elements are always operated in a reliable manner.

An especially flexible and easily manageable arrangement will result if the connections between the guide rails are plug connections. These can be produced without tools at any time and then separated again, so that alterations can be carried out quickly and inexpensively.

Each guide rail has at least one hook-shaped end, where the hook-shaped ends are preferably designed in a diametrically opposed manner and/or have the same shape.

The invention also provides that the guide rails are connected or connectable with an actuator through a thrust element so that there is a tensile strength between the guide rails and the thrust element in respect to the first direction. The ends of the guide rails that face the actuator can be made to engage with the thrust element in a solid and/or form-fitted manner. The guide rails and the thrust element functionally form a U-shaped frame.

Another important aspect of the invention provides that the ends of the guide rails that face away from the actuator can be made to engage with the hook-shaped ends of the additional guide rails in a solid or form-fitted manner.

According to the invention, every displaceable element is forcibly guided into the second direction, where the lifting plates are preferably arranged between two stops. Alternatively, the displaceable elements can be arranged between two common stops, where the displaceable elements can be connected with each other in a separable manner.

In order to be able to adjust the operating device and the valve needles individually to the tool, the valve needles are arranged so that they can be aligned along the second direction relative to the displaceable element. In order to additionally guarantee a continuous synchronous function with a simultaneous motion equalization, the valve needles can be attached to the displaceable elements according to another aspect of the invention in an axially fixed and radially floating manner.

The displaceable elements already have or form at least one recess for the passage of a flow channel, distributor arm, etc. between the valve needles in an additional design version of the invention.

In order to achieve a precise guidance of the guide rails, they are slide guided between guide elements. These can be formed like guide rails, for example, which are attached on or in a bolster plate. Here the guide rails have sliding strips at the side surfaces facing the guide rails, which are slide guided in the grooves of the guide rails.

A special version for implementing the invention has the provision that the operating device is formed in an injection moulding tool, especially in or on a bolster plate. For this purpose the latter has to be furnished with a recess to accommodate the operating device, which simplifies the installation.

There are other important advantages if the operating device is flush with the bolster plate. This does not change the overall height of the injection moulding tool.

BRIEF DESCRIPTION OF THE DRAWINGS

Other characteristics, details and advantages of the invention can be found in the wording of the claims as well as the following description of design examples based on the drawings. The following are shown:

DETAILED DESCRIPTION OF THE INVENTION

Figure 1:
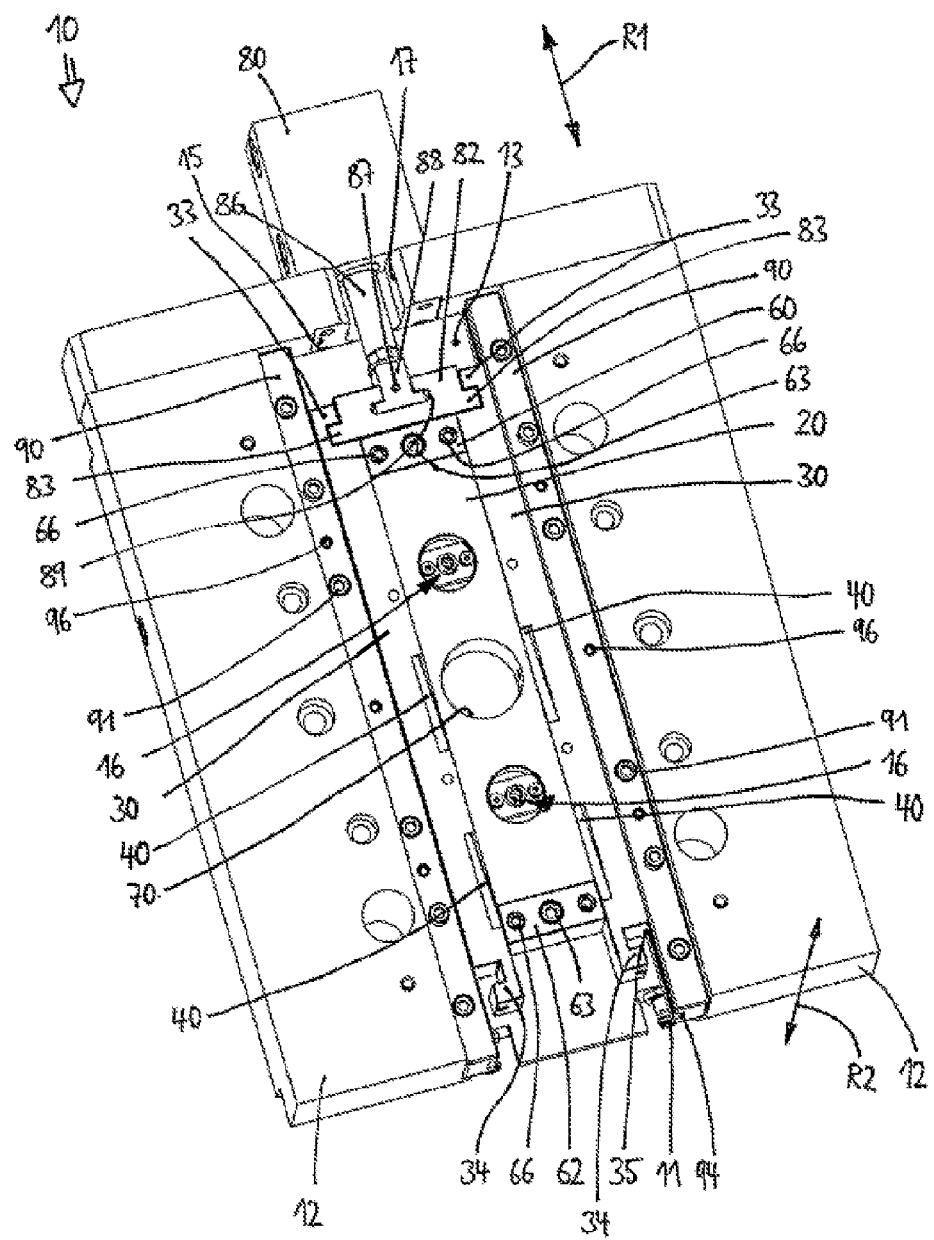
FIG. 1 an oblique view of an operating device for injection moulding tools.

The operating device generally referred to as 10 in FIG. 1 provides for the actuation of several shut-off needles 16 in one (not additionally depicted) injection moulding device. The latter serves to manufacture mould parts from a flow-capable mass, such as melted plastic material. For this purpose, several (not depicted) needle valve nozzles are arranged below an (also not depicted) distribution plate. These guide the melted plastic material to be processed towards a separable (also not depicted) mould insert, whose sprue opening is periodically opened and closed by the shut-off needles 16.

A bolster plate 12 is positioned above the distribution plate, which is furnished with a rectangular indentation or recess 13 to accommodate the operating device 10. The hoses or pipes for a flow medium can be connected to the connections 11 so that the flow medium penetrates the bolster plate 12 through drill holes (not described in more detail). This results in a continuous optimal tempering of the bolster plate along with the operating device 10, especially by cooling, which has a favorable effect on the operating behavior.

In order to operate the shut-off needles 16 of the needle valve nozzles simultaneously, a displaceable element 20 is provided for, which two shut-off needles 16 are attached to in the design version of FIG. 1. The displaceable element 20 is preferably formed as a rectangular plate that lies parallel to the bolster plate 12 and is arranged along the long side between two displaceably positioned guide rails 30. In the front the plate 20 is positioned between two solidly attached stops, 60, 62, which are affixed by means of screws 63 in the indentation 13 of the bolster plate 12. Dowel pins 66 ensure a precise alignment of the stops 60, 62, which are preferably rectangular in the cross section, where the pins 66 are solidly affixed to the bolster plate 12 and are received in a form-fitted manner by the drill holes (not described in more detail) in the stops 60, 62.

Figure 3:
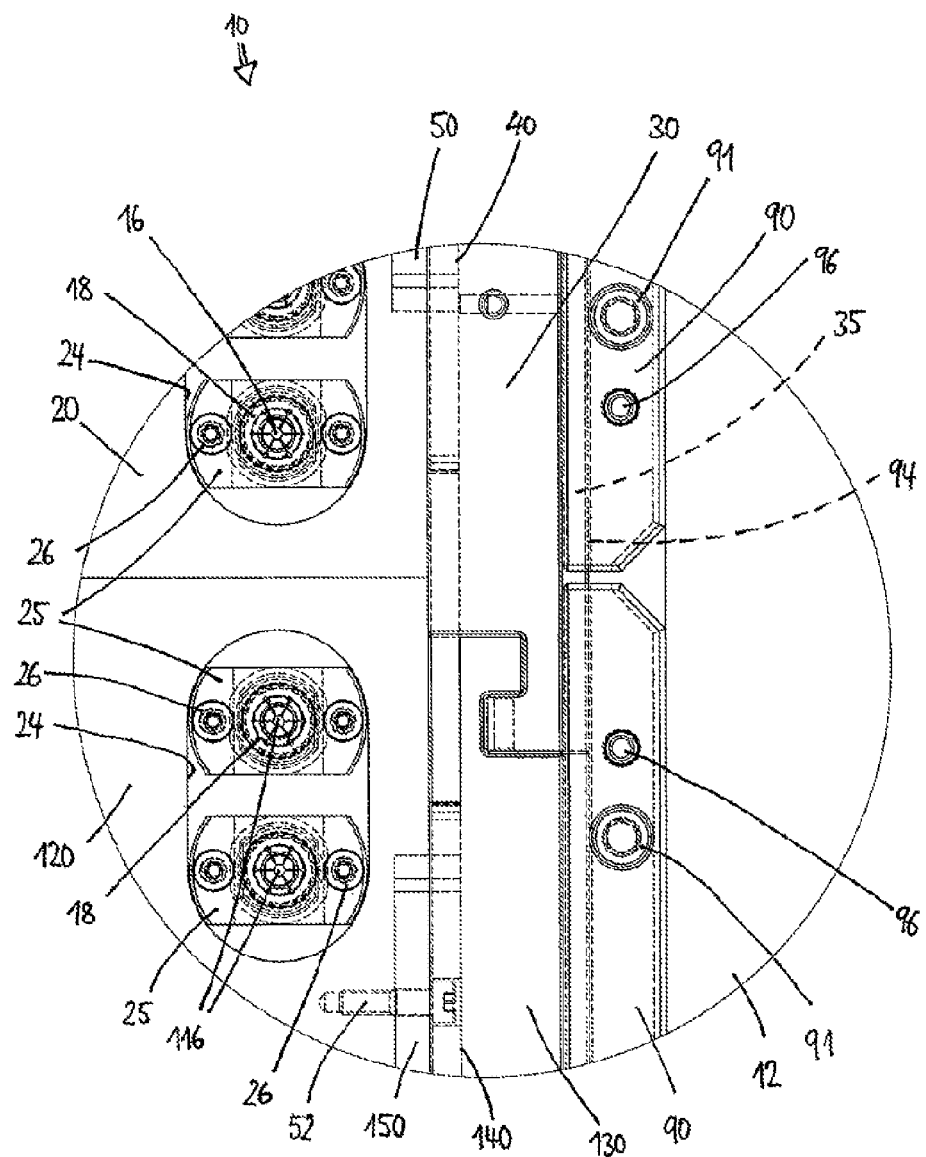
FIG. 3 a detail view of another design version of an operating device.

The lifting plate 20 has two gliding elements 50 each on the sides, which are slide guided in the guide rails 30 in a parallel manner (see FIG. 3). Here the latter are each furnished with two grooves 40 running obliquely to the bolster plate 12 on the side surfaces facing the lifting plate, where the grooves accommodate the slide elements 50 with only a small amount of leeway.

The guide rails 30 are arranged within the indentation 13 between two solidly fixed guide rails 90 in a first direction D1 parallel to the bolster plate 12 in a longitudinally displaceable manner and connected with a common thrust element 82 and an adapter element 86 with an actuator 80. This is preferably attached on the outside of the bolster plate 12, where the adapter element 86 is guided through an opening 17 or recess in the bolster plate 12. The actuator 80 can consist of an electric, pneumatic or hydraulic actuator or engine that is preferably operated by an (also not shown) electronic control system.

Each guide rail 30 is equipped with hook-shaped ends 33 on the actuator side, which can be made to engage with the thrust element 82 on the sides. The latter has two step-shaped ends 83 for this purpose, which are accommodated in a form-fitting manner by the hooks of the guide rails 30 facing inside vertically in respect to the first direction D1. This creates a connection with continuous tensile strength in the first direction D1, which can be separated in a vertical manner. The components 30, 82 can therefore be exchanged quickly at any time, for example if a longer and/or wider lifting plate 20 is being used. During the assembly the elements 30, 82 are simply plugged into each other without tools and are solidly coupled to each other once they are installed. The handling of the entire operating device is very simple; the installation costs are low.

The connection between the thrust element 82 and the adapter element 86 forms a sliding block 88 that is connected with the adapter element 86 through a pin 87 and which is plugged into the thrust element 82 in a form-fitting manner, also without tools. The latter is furnished with a recess clearing 89 for this purpose.

Figure 2:
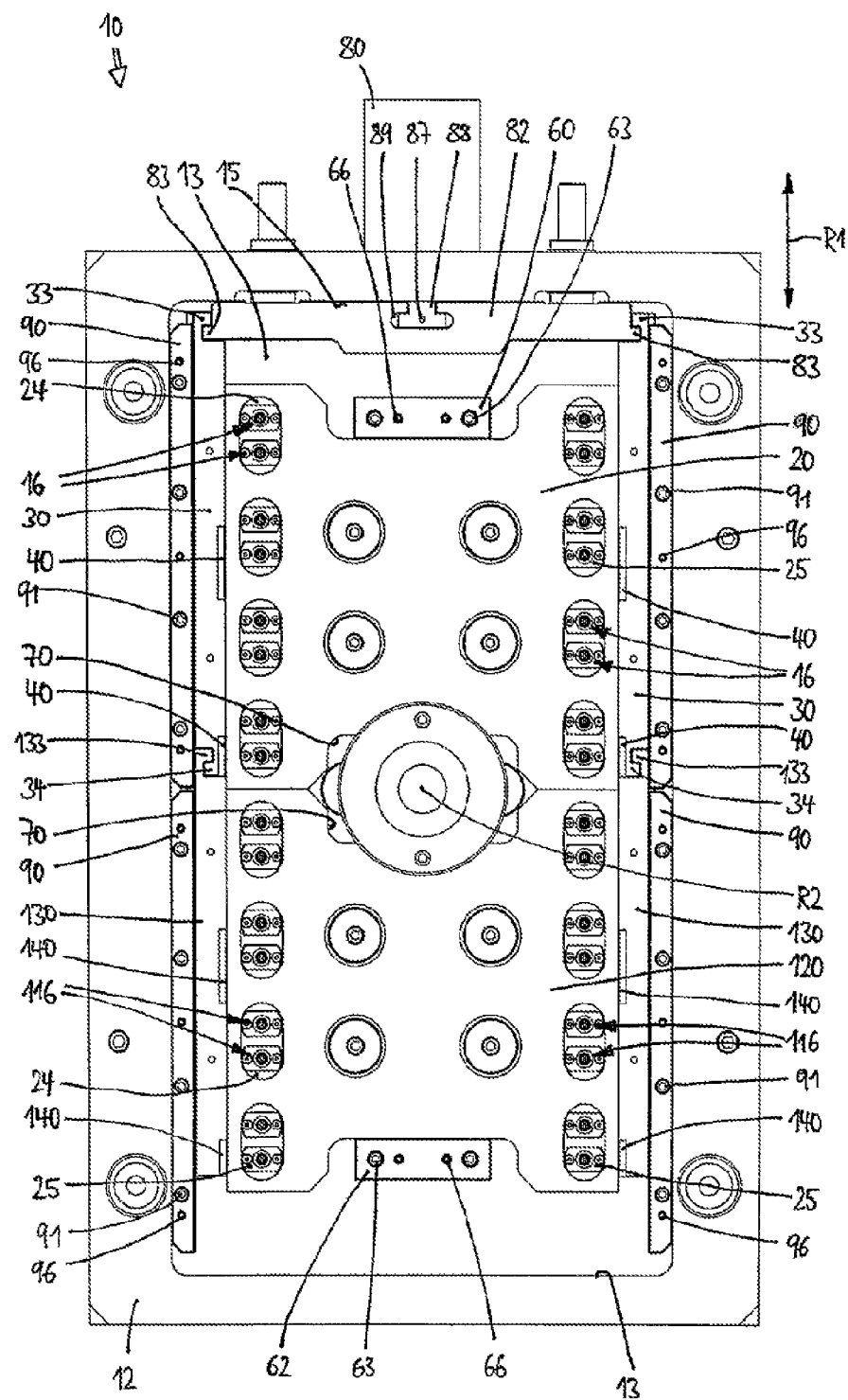
FIG. 2 a top view of a different design version of an operating device.

As shown by FIG. 2, two additional guide rails 130 can be coupled to the guide rails 30. Another displaceable element 120 lies between these parallel to the bolster plate 12, which is connected to the first lifting plate 20 as a rectangular plate with the same width and to which additional shut-off needles 116 are attached. Both plates 20, 120 are positioned together in a longitudinal direction between two solidly attached stops 60, 62, which are affixed in the indentation 13 of the bolster plate 12 by means of screws 63. Here two dowel pins 66 ensure a precise alignment of the stops 60, 62.

The additional lifting plate 120—like the lifting plate 20—has two gliding elements 150 on each side, which are slide guided in the guide rails 130 in a parallel manner (see FIG. 3). Here the latter are each furnished with two grooves 140 running obliquely to the bolster plate 12 on the side surfaces facing the lifting plate 120, where the grooves accommodate the slide elements 150 with only a small amount of leeway.

The additional guide rails 130 are also slide guided in a longitudinally displaceable manner between the two solidly attached guide rails 90. The latter lie sideways in the indentation 13 of the adapter plate 12. They are attached in the indentation 13 with screws 91 and each furnished with a consistent guide slot 94 running parallel to the adapter plate 12 at the side surfaces facing the guide rails 30, 130. Each guide slot 94 accommodates a sliding strip 35 with a low amount of leeway, each of which is formed at one of the side surfaces of the guide rails 30, 130 facing the guide rails 90. Dowel pins 96 ensure a precise alignment of the guide rails 90 inside the indentation 13. They are solidly affixed to the bolster plate 12 and are received in a form-fitted manner by the drill holes (not described in more detail) in the guide rails 90.

It is possible to recognize that the guide rails 30, 130 and the thrust element 82 form a U-shaped plug-in frame that laterally encompasses the lifting plates 20, 120 and (in FIG. 1) the stops 60, 62 with a low amount of leeway and which is slide guided from the outside between the guide rails 90. If the actuator 80 periodically moves the frame 30, 130, 82 back and forth in the first direction D1, the lifting plates 20, 120 that are forcibly guided between the stops 60, 62 are moved up and down in a second direction D2 vertically in respect to the direction D1 by the gliding elements 50, 150 that are guided in the oblique grooves 40, 140 of the guide rails 30, 130. The lifting plates 20, 120, which rest flush against each other with their fronts (not described in more detail) therefore carry out a displacement motion together with the shut-off needles 16, 116 that are fastened to them, which activates all shut-off needles 16, 116 continuously at the same time and with the same clamp force.

In order for the lifting plates 20, 120 to carry out a defined and always reproducible displacement motion, the motion of the thrust element 82 is limited by stops in the first direction D1. The face wall 15 of the indentation 13 creates a first stop while the stop 60, facing the actuator 80, forms a second stop. The distance between the face wall 15 and the stop 60 determines the course for the thrust element 82 and therefore for the guide rails 30, 130, which are movable back and forth between at least two defined positions. Depending on the oblique position of the grooves 40, 140 and the gliding elements 50, 150, the lifting plates 20, 120 carry out a correspondingly defined displacement motion, where it is also possible to achieve targeted interim positions by means of the actuator 80, for example if the shut-off needles 16, 116 have to be brought into different shutting and opening positions. The separable plug connections between the construction elements 30, 82 and 82, 88 and 30, 130 have the advantage that the operating device 10 can be installed quickly and comfortably from the top in the recess 13 of the stop plate 12. Only the stops 60, 62 are already inserted into the indentation 13. The entire operating device 10 therefore consists of only a few parts with a simple geometry. It is extremely easy to install and can be expanded at any time. By the same token, the lift elements 20, 120, the guide rails 30, 130, the thrust element 82 and the guide rails 90 can be removed quickly and comfortably from the bolster plate 12 at any time, e.g. to replace defective construction elements, replace the shut-off needles 16, 116 or carry out other maintenance tasks.

The slide elements 50, 150 of the lifting plates 20, 120 are preferably long keys that run at the same angle to the bolster plate 12 as the grooves 40, 140 of the guide rails 30, 130. They are recessed in the side surfaces of the lifting plate 20 and firmly attached with one or two screws 52. The lifting plates 20, 120 are furnished with corresponding recesses (not described in more detail), which pick up the keys 50 in a form-fitting manner.

The shut-off needles 16, 116 are inserted into the lifting plates 20, 120 from the top, which have been furnished with drill holes (not described in more detail). In the area of the lifting plates 20, 120, each needle 16, 116 has a threading on one side that is screwed into a (not visible) mostly rectangular mounting plate. An adjusting nut 18 affixes the needle 16, 116 across from the mounting plate, which lies flat on the lifting plate 20, 120. This way the needles 16, 116 can be individually length-adjusted towards the second direction D2 relative to the lifting plate 20, 120.

Each mounting plate is inside an (also not shown) recess clearing whose height is nearly exactly the same as that of the mounting plate and whose exterior dimensions are larger than that of the mounting plate so that it may move radially inside the recess clearing. A cover plate 25 that is attached to the lifting plate 20 with screws 26 secures the mounting plate in the recess clearing. The mounting plate is therefore solidly positioned in an axial direction to the shut-off needles 16, 116 with the lowest amount of leeway between the lifting plate 20, 120 and the cover plate 25 so that all needles 16, 116 can always be brought precisely into the shut-off position and opened again. In the radial direction, however, the mounting plates are floating so that any deviations of the needles 16, 116 inside the hot-runner nozzles can be balanced out during the displacement motions. The form of the mounting plate has the result that the needles 16, 116 are also arranged in a torque-proof manner across from the lifting plate 20.

The needles 16, 116 and their adjusting nuts 18 protrude through the cover plates 25. But in order for the ends of the needles to not project too far above the lifting plates 20, 120, the mounting plates and the cover plates 25 are inside indentations 24, which are furnished in the lifting plates 20, 120 from above. The overall height of the operating device 10 therefore remains low.

In the middle between the indentations 24, a centered recess 70 is set into the lifting plate 20 (see FIG. 1), which continues with the same interior diameter in the bolster plate 12. The recess 70 serves for the passage of a flow channel, a distributor arm or the like, especially for a machine nozzle (not depicted) or sprue bush, which supplies the distribution plate lying underneath the bolster plate 12 with the plastic mass to be processed. The interior diameter (not described in more detail) of the recess 70 is dimensioned in such a way that the lifting plate 20 can move without obstruction.

In the design version of FIG. 2, the recess 70 is jointly formed by both lifting plates 20, 120, which are each furnished with a partial recess on the sides that adjoin each other, so that the machine nozzle or sprue bush can be guided through the center between the lifting plates 20, 120.

The closure of the operating device 10 is formed by a cover plate (not depicted), which lies flat on the guide rails 90 and is secured to them by means of screws (also not depicted). The cover plate 19 secures all plug connections and preferably ends flush with the top of the bolster plate 12 so that the operating device 10 does not protrude above the bolster plate 12. The device 10 is rather integrated almost completely into the bolster plate 12, which has an extremely favorable effect on the overall height of the tool. Only the actuator 80 is positioned outside on the bolster plate 12, which however has no effect on its overall height.

In the design version of FIG. 1, two shut-off needles 16 of one nozzle group are attached to the displaceable element 20. However, it is easily possible to increase the amount of shut-off needles 16, e.g. by having the lifting plate 20 be formed longer or wider accordingly. In the design example of FIG. 2, a total of 32 shut-off needles 16, 116 are attached to each lifting plate 20, 120, where two needles 16, 116 at a time lie in an indentation 24 in small intervals. For an ideal use of the available tool surface, several mould inserts and therefore several needle valve nozzles can thus lie next to each other very closely.

The arrangement of two operating devices 10 side by side is also conceivable. For that purpose the bolster plate 12 is furnished with two side by side indentations 13 or with a common indentation, so that the guide rails 30, 130 and the guide rails 90 of the individual operating devices 10 lie parallel next to each other.

The invention is not restricted to one of the predescribed design versions but can be modified in many different ways. The guide rails 30 and the thrust element 82 as well as the guide rails 30, 130 can also be connected to each other solidly tightened, for example with stop elements (not shown). The displaceable elements 20, 120 can also be connected to each other in a separable manner. The mounting plates of the shut-off needles 16, 116 can be in the shape of disks that are flattened on two opposing sides.

The ends (not described in more detail) of the additional guide rails 130 that are facing away from the actuator 80 can also have a hook shape so that additional guide rails may be coupled to them. These hook ends also have the same shape as the hook ends 33, 34, 133 and designed in such a way that a continuous tensile strength is created in the first direction D1, which can be separated in a vertical direction.

It is therefore possible to design the entire operating device 10 as a modular system that can be assembled individually and flexibly with a few basic elements 30, 130, 20, 120, 82, 90. All construction elements can quickly be connected to each other by hooking or plugging in and separated again if required. The guide rails here are preferably furnished with hook-shaped ends on both sides, which additionally simplifies the fabrication. The operating device 10 can therefore be expanded at any time without great effort or adapted to a different use.

All characteristics and advantages, including design details, spatial arrangements and procedural steps that can be inferred from the claims, the description and the drawing can be essential to the invention by themselves as well as in different combinations.

LIST OF REFERENCE NUMERALS

| | |
|---|---|
| D1 | first direction |
| D2 | second direction |
| 10 | Operating device |
| 11 | Connections |
| 12 | Bolster plate |
| 13 | Indentation/recess |
| 14 | Bottom |
| 15 | Face wall |
| 16 | Shut-off needle |
| 17 | Opening |
| 18 | Adjusting nut |
| 20 | Displaceable element/lifting plate |
| 22 | Side surface |
| 23 | Recesses |
| 24 | Indentation |
| 25 | Cover plate |
| 26 | Screw |
| 30 | Guide rail |
| 33 | Hook-shaped end |
| 34 | Hook-shaped end |
| 35 | Sliding strip |
| 40 | Groove |
| 46 | Screws |
| 47 | Screws |
| 50 | Slide element/key |
| 52 | Screw |
| 60 | Stop |
| 62 | Stop |
| 63 | Screw |
| 66 | Dowel pin |
| 70 | Recess |
| 80 | Actuator |
| 81 | Screw |
| 82 | Thrust element |
| 83 | Step-shaped end |
| 86 | Adapter element |
| 87 | Pin |
| 88 | Sliding block |
| 89 | Recess clearing |
| 90 | Guide rail |
| 91 | Screw |
| 94 | Guide slot |
| 96 | Dowel pin |
| 116 | Shut-off needle |
| 120 | Displaceable element/lifting plate |
| 130 | Guide rail |
| 133 | Hook-shaped end |
| 140 | Groove |
| 150 | Slide element/key |

The invention claimed is:

1. Operating device (10) for shut-off needles in injection moulding tools with needle valve nozzles, said device having a displaceable element (20) with at least two shut-off needles (16), said element moved between two guide rails (30) mounted so as to be longitudinally displaceable in a second direction (D2) that is perpendicular to a first direction (D1), where at least two slide elements (50) are arranged between the displaceable element (20) and the guide rails (30) in grooves (40) running obliquely to the first direction (D1) and to the second direction (D2) which convert a movement of the guide rails (30) in the first direction (D1) into a displacement motion of the displaceable element (20) in the second direction (D2), characterized in that at least two additional guide rails (130) can be coupled to the guide rails (30) between which at least one additional displaceable element (120) is arranged which at least two additional shut-off needles (116) can be fastened to, where at least two slide elements (150) are arranged between the additional displaceable element (120) and the additional guide rails (130) in grooves (140) running obliquely to the first direction (D1) and to the second direction (D2), which convert a movement of the additional guide rails (130) along the first direction (D1) into a displacement motion of the additional displaceable element (120) in the second direction (D2).

2. Operating device according to claim 1, characterized in that the guide rails (30, 130) are connected to each other in a separable manner.

3. Operating device according to claim 1, characterized in that a tensile strength is created between the guide rails (30, 130) in the first direction (D1).

4. Operating device according to claim 1, characterized in that the coupling between the guide rails (30, 130) is a plug connection.

5. Operating device according to claim 1, characterized in that each guide rail (30) is furnished with at least one hook-shaped end (33, 34, 133).

6. Operating device according to claim 5, characterized in that the hook-shaped ends (33, 34, 133) of the guide rails (30, 130) are designed in a diametrically opposed manner.

7. Operating device according to claim 5, characterized in that the hook-shaped ends (33, 34, 133) of the guide rails (30, 130) are designed with the same shape.

8. Operating device according to claim 1, characterized in that the guide rails (30) are connected or connectable with an actuator (80) through a thrust element (82).

9. Operating device according to claim 8, characterized in that a tensile strength is created between the guide rails (30) and the thrust element (82) in the first direction (D1).

10. Operating device according to claim 8, characterized in that ends (33) of the guide rails (30) facing the actuator (80) can be made to engage with the thrust element (82) in a solidly tightened or form-fitting manner.

11. Operating device according to claim 8, characterized in that the guide rails (30, 130) and the thrust element (82) form a U-shaped frame.

12. Operating device according to claim 1, characterized in that ends (34) of the guide rails (30) facing away from actuator (80) can be made to engage with hook-shaped ends (133) of the additional guide rails (130) in a solidly tightened or form-fitting manner.

13. Operating device according to claim 1, characterized in that each displaceable element (20, 120) in the second direction (D2) is forcibly guided between two stops (60, 62).

14. Operating device according to claim 1, characterized in that the displaceable elements (20, 120) in the second direction (D2) are forcibly guided between two stops (60, 62).

15. Operating device according to claim 1, characterized in that the displaceable elements (20, 120) are connected to each other in a separable manner.

16. Operating device according to claim 1, characterized in that the valve needles (16, 116) in the second direction (D2) can be aligned relative to the displaceable elements (20, 120).

17. Operating device according to claim 1, characterized in that the valve needles (16, 116) can be positioned in an axially fixed and radially floating manner on the displaceable elements (20, 120).

18. Operating device according to claim 1, characterized in that each displaceable element (20, 120) has at least one recess (70) for the passage of a flow channel, distributor arm or the like of the injection moulding tool.

19. Operating device according to claim 1, characterized in that the guide rails (30, 130) are slide guided between the guide elements (90).

20. Operating device according to the claim 19, characterized in that the guide elements (90) are guide rails that are attached on or in a bolster plate (12), where the guide rails (30, 130) have sliding strips (35) on side surfaces facing the guide rails (90) that are slide guided in grooves (94) of the guide rails (90).

21. Injection moulding tool with at least one operating device (10) according to claim 1.

22. Injection moulding tool according to claim 21, characterized in that the operating device (10) is formed in or on a bolster plate (12).

23. Injection moulding tool according to claim 22, characterized in that the bolster plate (12) is furnished with an indentation (13) to accommodate the operating device (10).

24. Injection moulding tool according to claim 21, characterized in that the operating device (10) ends flush with the bolster plate (12).

25. Injection moulding tool according to claim 21, characterized in that at least two guide rails (30, 130) and at least two displaceable elements (20, 120) are arranged one after the other in a longitudinal direction.

26. Injection moulding tool according to claim 21, characterized in that at least two displaceable elements are arranged in a parallel manner side by side.

27. Injection moulding tool according to claim 25, characterized in that the guide rails (30, 130) have a common actuator (80).

* * * * *